March 18, 1941.  A. STEIN  2,235,595
DEVICE FOR MOVING A VEHICLE AT AN ANGLE TO THE
DIRECTION IN WHICH IT RUNS NORMALLY
Filed Oct. 27, 1938

Inventor,
A. Stein
By: Glascock Downing & Seebold
Attys.

Patented Mar. 18, 1941

2,235,595

UNITED STATES PATENT OFFICE 2,235,595

DEVICE FOR MOVING A VEHICLE AT AN ANGLE TO THE DIRECTION IN WHICH IT RUNS NORMALLY

Alfred Stein, Erfurt, Germany

Application October 27, 1938, Serial No. 237,348
In Germany January 31, 1938

3 Claims. (Cl. 180—1)

My invention relates to a device for moving a vehicle at an angle to the direction in which it runs normally.

It is an object of my invention to provide a device by which a vehicle of any kind, including motor cars and railroad vehicles can be moved at an angle, and normally at right angles, to the direction in which the vehicle is constructed to run.

To this end, I provide a truck which is arranged to run in a direction at an angle to that in which the vehicle normally runs, a driving wheel on the truck, means for rotating the driving wheel, and means for raising and lowering the truck with respect to the frame.

It is another object of my invention to increase the adaptability of the device aforesaid.

To this end, I provide means for turning the vehicle frame with respect to the truck.

It is still another object of my invention to provide means for placing a railroad vehicle from one track to another.

To this end, in combination with a truck on the vehicle, as described, I arrange a portable track arranged to be placed transversely on a pair of parallel fixed tracks, for the truck to run on.

In the accompanying drawing, various embodiments of my invention are illustrated diagrammatically by way of example.

In the drawing.

Figure 1:
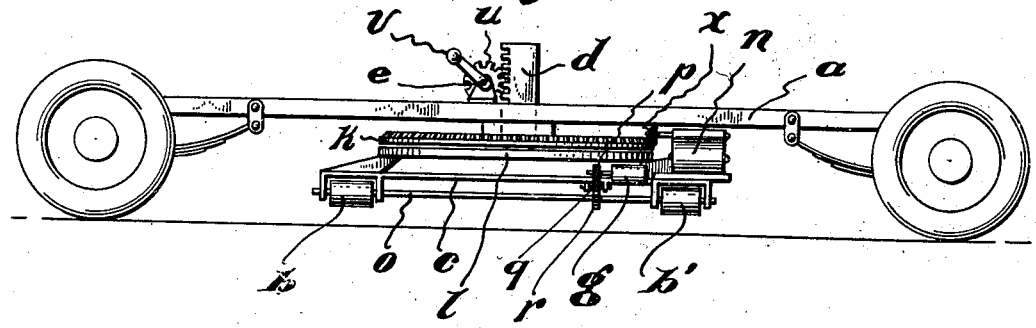
Fig. 1 is a side elevation of a motor vehicle equipped with the invention.
Figure 2:
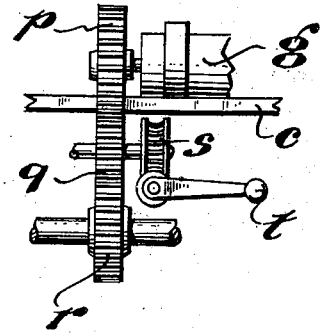
Fig. 2 is a detail of a modification of the invention for manually driving the wheel mounted truck.
Figure 3:
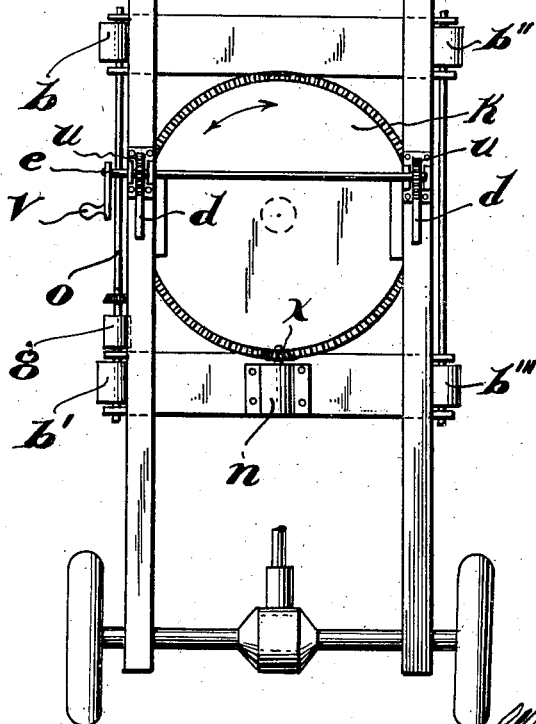
Fig. 3 is a top plan view of the invention applied to a vehicle chassis.

Referring now to the drawing, the chassis comprises the usual frame members $a$, and four wheels. Mounted to slide in, or on, the frame members $a$ are a pair of racks $d$ to which is fixed a turn table $k$ so that the turn table, the racks and the frame $a$ may rotate as a unit.

Mounted below and concentric to the upper turn table $k$ is a lower turn table $l$ to which the truck frame $c$ is connected. A motor $n$ suitably secured to the frame $c$ is provided with a beveled pinion $x$ meshing with a beveled ring gear $m$ on the upper turn table $k$. A driving shaft $o$ is arranged in suitable bearings on the truck frame $c$ at right angles to the axes of the wheels and driving wheels, or rollers, $b$ and $b'$ are arranged on the driving shaft $o$. In addition to the driving wheels, the truck frame supports a pair of carrying wheels $b''$ and $b'''$. A motor $g$, for instance, an electric motor, is arranged on the frame $c$ of the truck and is connected to the driving shaft $o$ through reduction gearing $p$, $q$, $r$. To provide for failure of the motor, a worm gear $s$ may be connected to the gearing at a suitable point, for instance, to the intermediate gear $q$, and equipped with a crank $t$.

Various means may be provided for raising and lowering the truck $c$. In the present instance, manual means is provided and comprises a shaft $e$ which is mounted in suitable bearings on the chassis $a$, a pinion $u$ for each rack $d$ on the shaft $e$, and a crank $v$ for rotating the shaft $e$. Obviously, a motor such as $g$ might be provided for rotating the shaft $e$, or the racks $d$ and the driving shaft $o$, or one of these elements, might be arranged to be operated from the engine of the car.

Instead of a pair of driving, and a pair of carrying wheels, as shown, the truck might be provided with three wheels, the third wheel being the driving wheel, or a carrying wheel.

It is known that it is often desirable to remove a given vehicle from a row of parked vehicles, for instance, motor cars, for using or repairing this given vehicle. My truck is so arranged that, when lowered and with the truck wheels in the position shown, it moves the vehicle at an angle of 90 degrees to the direction in which it normally runs. The vehicle can now be moved manually or mechanically and when it has arrived at the desired point the truck is elevated and the vehicle is now ready to run on its own wheels.

It is another advantage that a motor car or the like can be elevated on the truck for repairs, dispensing with the tedious jacking which is very difficult for unskilled drivers.

When it is desired to turn the car through any angle about the axis of the turntables $k$ and $l$, up to 180 degs., the truck $c$ is lowered together with the turntables $k$ and $l$ until its wheels are on the ground, and then the frame $a$ is elevated as far as required. The motor $n$ is now started and the upper turntable $k$ is rotated while the lower turntable $l$ remains in its fixed position. Any suitable means may be provided for cutting out the motor $n$ when the frame $a$ has been turned to the extent required.

This expedient is very desirable for motor cars on narrow streets for adjusting the vehicle for another direction of running.

I claim:

1. In a vehicle having a main frame, a device for moving said vehicle at an angle to its normal running direction, comprising an auxiliary frame, at least one driving wheel on said auxiliary frame, means on said auxiliary frame for driving said wheel, a fixed table member mounted on said auxiliary frame, a turntable rotatably mounted on said fixed table member and arranged concentrically to the latter, vertical means slidable in said main frame and operatively connected to said rotatable turntable for raising and lowering said auxiliary frame, and means carried by said auxiliary frame for rotating said turntable with respect to said auxiliary frame.

2. Apparatus as claimed in claim 1 including a bevel gear on the periphery of said turntable, and a bevel pinion operatively connected to said last named means.

3. Apparatus as claimed in claim 1 wherein said vertical means comprises a pair of racks.

ALFRED STEIN.